United States Patent
Mochizuki et al.

(10) Patent No.: US 8,967,702 B2
(45) Date of Patent: Mar. 3, 2015

(54) STRUCTURE OF VEHICLE BODY REAR PART

(71) Applicant: Suzuki Motor Corporation, Shizuoka-ken (JP)

(72) Inventors: Shinei Mochizuki, Shizuoka-ken (JP); Koji Oishi, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/948,375

(22) Filed: Jul. 23, 2013

(65) Prior Publication Data
US 2014/0028058 A1    Jan. 30, 2014

(30) Foreign Application Priority Data
Jul. 26, 2012   (JP) .................................. 2012-165831

(51) Int. Cl.
  B62D 25/08     (2006.01)
  B62D 25/02     (2006.01)
  B62D 25/04     (2006.01)

(52) U.S. Cl.
  CPC ................ B62D 25/08 (2013.01); B62D 25/02 (2013.01); B62D 25/04 (2013.01)
  USPC .............. 296/187.11; 296/193.08; 296/146.9

(58) Field of Classification Search
  CPC ............ B60J 5/10; B60J 5/101; B62D 21/52; B62D 25/08
  USPC ........... 296/146.8, 146.9, 181.1, 187.11, 191, 296/193.01, 193.08, 203.04
  See application file for complete search history.

(56) References Cited

U.S. PATENT DOCUMENTS

| 4,799,730 | A  | * | 1/1989  | Harasaki ................... 296/203.04 |
| 6,007,133 | A  | * | 12/1999 | Heim et al. ..................... 296/56 |
| 6,102,470 | A  | * | 8/2000  | Heim et al. .............. 296/187.11 |
| 2004/0176021 | A1 | * | 9/2004 | Mills ............................. 454/143 |
| 2011/0156437 | A1 | * | 6/2011 | Kishino ..................... 296/146.8 |
| 2012/0153677 | A1 | * | 6/2012 | Matsuura et al. ........ 296/193.08 |

FOREIGN PATENT DOCUMENTS

JP          2009061982 A        3/2009

* cited by examiner

*Primary Examiner* — Glenn Dayoan
*Assistant Examiner* — Jason S Daniels
(74) *Attorney, Agent, or Firm* — Lerner, David, Littenberg, Krumholz & Mentlik, LLP

(57) ABSTRACT

Structure of a vehicle body rear part in which a back door opening section around which a closed cross-sectional structure is provided wherein the vehicle body rear part includes rear lamp house panels, a back panel section and a back door opening section arranged to incline obliquely such that a lower part is located further toward a vehicle back than an upper part. In the structure, a tail end member extending along a vehicle width direction is coupled to lower side corner portions of the closed cross-sectional structure located on both the left and right sides of the back door opening section, swelling sections extending further outward than the lower side corner portions of the closed cross-sectional structure are provided on both the left and right sides of the tail end member, and the swelling sections are joined to the rear lamp house panels and the back panel section.

6 Claims, 4 Drawing Sheets

STRUCTURE OF VEHICLE BODY REAR PART

CROSS-REFERENCE TO RELATED APPLICATIONS

The present application claims priority from Japanese Patent Application No. 2012-165831 filed Jul. 26, 2012, the disclosure of which is hereby incorporated herein by reference.

TECHNICAL FIELD

The present invention relates in particular to the structure of a vehicle body rear part of a hatchback type vehicle including a back door.

BACKGROUND ART

Among vehicles, there is an automobile of a hatchback type including a back door. In a vehicle body rear part of the vehicle of this type, a back door opening section having a round structure opened and closed by the back door is provided.

In the past, in the vehicle body rear part of such a vehicle, the back door opening section is formed in a closed cross-sectional structure, whereby torsional rigidity is secured (see, for example, Patent Document 1).

PRIOR ART

Patent Document

[Patent Document 1] Japanese Patent Application Laid-Open No. 2009-61982

SUMMARY OF INVENTION

Problems to be Solved by the Invention

However, in the structure of the vehicle body rear part in the past explained above, since vehicle body torsional rigidity depends on the round closed cross-sectional structure of the back door opening section, the rigidity of lower side corner portions of the closed cross-sectional structure located on both the left and right sides of the back door opening section is insufficient. Furthermore, in the structure of the vehicle body rear part in the past, when the back door opening section is arranged to incline obliquely and a lower part is located further toward the vehicle back than an upper part, if an upward load is applied from one side of a pair of left and right rear suspensions, the load acts obliquely on the round closed cross-sectional structure. As a result, it is likely that the portion of the round closed cross-sectional structure is deformed to be distorted in the vehicle front back direction on both the left and right sides and a pillar in a vehicle body rearmost part (a D pillar) falls down.

The present invention has been devised in view of such an actual situation and it is an object of the present invention to provide the structure of a vehicle body rear part that can improve the rigidity of the left and right lower side corner parts of the round closed cross-sectional structure of the back door opening section through coupling of a tail end member and can reduce twisting deformation of the vehicle body in which the portion of the round closed cross-sectional structure are distorted on both the left and right sides and improve driving stability and riding comfort performance of the vehicle.

Means for Solving the Problems

In order to solve the problem of the related art, the present invention provides the structure of a vehicle body rear part in which a back door opening section around which a closed cross-sectional structure is provided is provided in the vehicle body rear part including rear lamp house panels and back panels and the back door opening section is arranged to incline obliquely such that a lower part is located further toward a vehicle back than an upper part. In the structure of the vehicle body rear part, a tail end member extending along a vehicle width direction is coupled to lower side corner portions of the closed cross-sectional structure located on both the left and right sides of said back door opening section, swelling sections extending further outward than the lower side corner portions of said closed cross-sectional structure are provided on both the left and right sides of said tail end member, and the swelling sections are joined to said rear lamp house panels and said back panels.

In the present invention, a part of said rear lamp house panels is formed in a shape having rear surfaces and side surfaces; the swelling sections of said tail end member are formed in a shape having at least upper surfaces, rear surfaces, and side surfaces; the upper surfaces of said swelling sections and the side surfaces of said rear lamp house panels are arranged to be continuously linked; and the rear surfaces of said swelling sections and the rear surfaces of the rear lamp house panels are arranged to be continuously linked.

Further, in the present invention, vehicle body outer side portions of the swelling sections of said tail end member are joined to quarter panels that configure outer side panel structure members of the vehicle body rear part.

In the present invention, outlet and inlet components for vehicle interior air are arranged in the swelling sections of said tail end member, and communication holes for said outlet and inlet components are provided in the rear surfaces of said swelling sections.

Advantageous Effects of Invention

As explained above, in the structure of the vehicle body rear part according to the present invention, a back door opening section around which a closed cross-sectional structure is provided is provided in a vehicle body rear part including rear lamp house panels and back panels and the back door opening section is arranged to incline obliquely such that a lower part is located further toward a vehicle back than an upper part. A tail end member extending along a vehicle width direction is coupled to lower side corner portions of the closed cross-sectional structure located on both the left and right sides of said back door opening section, swelling sections extending further outward than the lower side corner portions of said closed cross-sectional structure are provided on both the left and right sides of said tail end member, and the swelling sections are joined to said rear lamp house panels and said back panels. Therefore, it is possible to realize improvement of the rigidity of the lower side corner portions of the closed cross-sectional structure located on both the left and right sides of the back door opening section. In the structure of the vehicle body rear part of the present invention, the lower side corner portions of the closed cross-sectional structure located on both the left and right sides of the back door opening section are coupled by the tail end member. Therefore, even if an upward load is applied from a rear suspension on one side among a pair of left and right rear suspensions and the like, it is possible to reduce distortion of the portion of the round closed cross-sectional structure in a vehicle front back direction on both the left and right sides and suppress vehicle body twisting deformation. Moreover, since the swelling sections of the tail end member extend further outward than the lower side corner portions of the closed cross-sectional structure, it is possible to receive loads of twisting deformation or the like of the lower side corner portions of the round closed cross-sectional structure. It is possible to further reduce the distortion of the portion of the round closed cross-sectional structure on the left and right. Therefore, in a vehicle to which the structure of the vehicle body rear part of the present invention is applied, it is possible to improve driving stability and improve riding comfort performance.

In the present invention, a part of said rear lamp house panels is formed in a shape having rear surfaces and side surfaces; the swelling sections of said tail end member are formed in a shape having at least upper surface, rear surfaces, and side surfaces; the upper surfaces of said swelling sections and the side surfaces of said rear lamp house panels are arranged to be continuously linked; and the rear surfaces of said swelling sections and the rear surfaces of the rear lamp house panels are arranged to be continuously linked. Therefore, it is possible to smoothly transfer and disperse loads, which are generated, for example, when the lower side corner portions of the round closed cross-sectional structure is torsionally deformed, from the lower side corner portions to the swelling sections of the tail end member and suppress local concentration of the loads.

In the present invention, vehicle body outer side portions of the swelling sections of said tail end member are joined to quarter panels that configure outer side panel structure members of the vehicle body rear part. Therefore, it is possible to transfer loads from the lower side corner portions of the round closed cross-sectional structure to the outer side panel structure members such as the quarter panels via the swelling sections of the tail end member and realize diffusion of the loads and attain a further effect.

In the present invention, outlet and inlet components for vehicle interior air are arranged in the swelling sections of said tail end member, and communication holes for said outlet and inlet components are provided in the rear surfaces of said swelling sections. Therefore, it is possible to use the swelling sections of the tail end member without separately preparing a space for arranging the outlet and inlet components for the vehicle interior air and realize effective utilization of a space. Moreover, corner portions of the outer side panel structure member of the vehicle body rear part can be arranged adjacent to the rear end of a vehicle interior luggage compartment space and can communicate with the outlet and inlet components at a short distance. Control of the vehicle interior air is simplified and a necessary air path area only has to be set. Therefore, it is possible to simplify the structure of ventilation components or the like, which are the outlet and inlet components, and realize a cost reduction.

MODE FOR CARRYING OUT THE INVENTION

Figure 1:
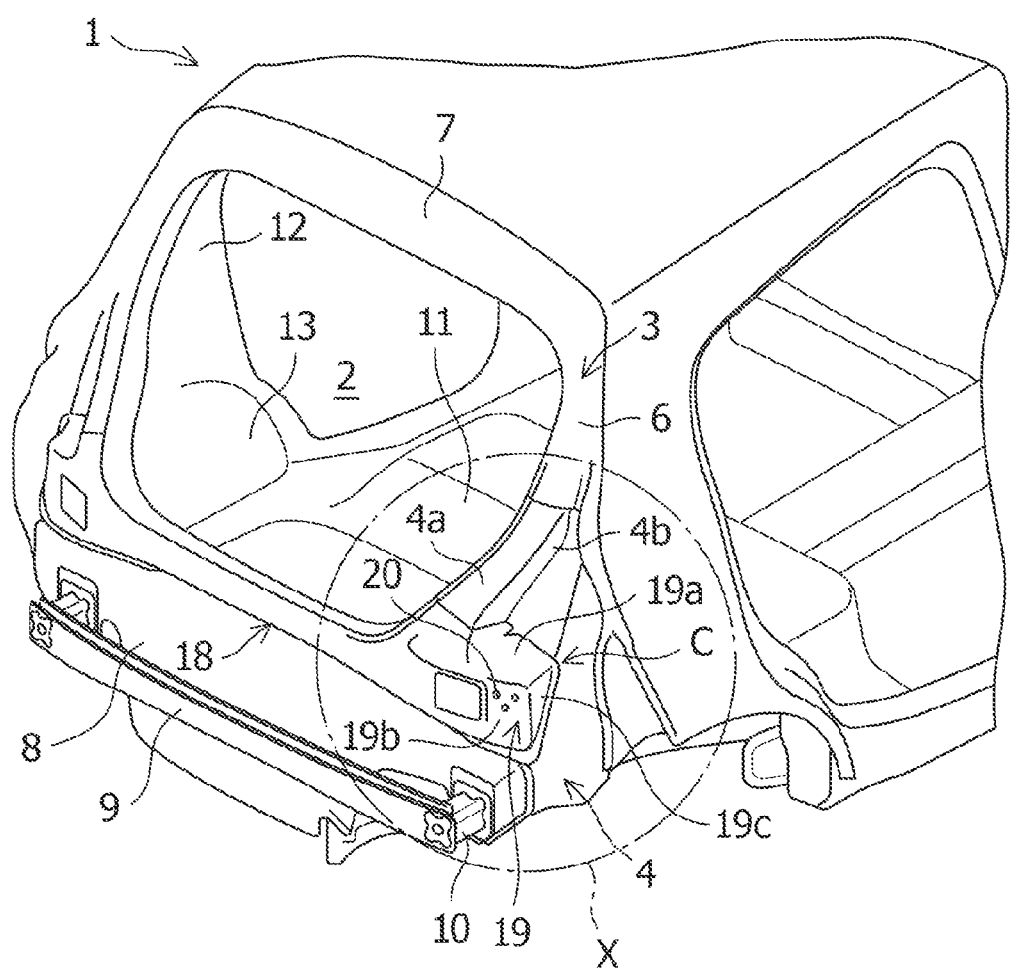
FIG. 1 is a perspective view of a vehicle body rear part of a vehicle, to which structure according to an embodiment of the present invention is applied, viewed from obliquely rear of the vehicle.

The present invention is explained in detail below on the basis of an embodiment shown in the figures.

FIGS. 1 to 6 show the structure of a vehicle body rear part according to the embodiment of the present invention.

A vehicle to which the structure according to the present invention is applied is, as shown in FIGS. 1 to 5, an automobile of a hatchback type including a back door (not shown in the figures). In a vehicle body rear part 1 of the vehicle, a back door opening section 2 opened and closed by the back door (not shown in the figures) and around which a closed cross-sectional structure is provided is provided. Both left and right side portions in the vehicle width direction of the back door opening section 2 and standing portions in the vehicle up down direction standing upward from both the left and right side portions are configured as pillar sections in rearmost parts (pillar sections) 3. Moreover, as indicated by a dot-dash line in FIG. 4, the upper surface of the back door opening section 2 is arranged to incline obliquely such that a lower part is located further toward the vehicle back than an upper part.

The pillar sections 3 include rear lamp house panels 4 and rear lamp house inner panels 5 arranged in lower corner portions C of the closed cross-sectional structure of the back door opening section 2 and side body extension panels 6 arranged to be coupled to upper parts of the rear lamp house panels 4 and extending along the vehicle up and down direction. Each of the rear lamp house panels 4 and the side body extension panels 6 are joined to pillar inner panels, pillar outer panels, and the like on the inner and outer sides, which are not shown in the figures, to thereby be formed in a closed sectional shape. Overlapping portions of the rear lamp house panels 4 on the vehicle body outer side and the rear lamp house inner panels 5 on the vehicle body inner side are joined by spot welding in a plurality of places.

Between upper end portions of the pillar sections 3, as shown in FIGS. 1 to 4, a roof back member section 7 joined to the left and right upper side corner portions of the back door opening section 2 is disposed along the vehicle width direction. The roof back member section 7 is configured by joining a roof back inner member on the inner side and a roof back outer member on the outer side to each other. Between the lower end portions of the pillar sections 3, a back panel section 8 joined to left and right lower side corner portions C of the closed cross-sectional structure of the back door opening section 2 is disposed along the vehicle width direction. The back panel section 8 is configured by joining a back inner panel on the inner side and a back outer panel on the outer side to each other. The both left and right end portions of a rear bumper member 9 extending along the vehicle width direction are attached to the rear surface side of the back panel section 8 via rear crush boxes 10. Note that, in the vehicle body rear part 1 in this embodiment, a rear floor panel 11, quarter panel extension panels 12, rear wheel house inner panels 13, and the like are disposed on a vehicle interior side. Quarter panels 14, rear wheel house outer panels 15, side body outer panels 16, rear side members 17, and the like, which configure outer side panel structure members, are disposed on a vehicle exterior side.

On the other hand, as shown in FIGS. 1, 2, and 4 to 6, in a position on the lower part side of the back door opening section 2, a tail end member 18 arranged on the rear surface side of the back panel section 8 and extending along the vehicle width direction is coupled to the lower side corner portions C of the closed cross-sectional structure located on both the left and right sides of the back door opening section 2 in this embodiment. On both the left and right sides of the tail end member 18, swelling sections 19 extending further outward than the lower side corner portions C of the closed cross-sectional structure and having hollows on the insides are provided. The swelling sections 19 are respectively joined to the rear lamp house panels 4 and the back outer panel of the back panel section 8. Therefore, both the left and right side portions of the tail end member 18 are formed larger in up down length and the like than the middle portion extending in the vehicle width direction.

The rear lamp house panels 4 in this embodiment are formed in a size and a shape capable of covering the lower side corner portions C of the closed cross-sectional structure in conjunction with the rear lamp house inner panels 5. Moreover, upper parts of the rear lamp house panels 4 are formed to be bent in a shape corresponding to the pillar sections 3. The upper parts of the rear lamp house panels 4 include rear surfaces 4a and side surfaces 4b that overlap the pillar sections 3.

The swelling section 19 of the tail end member 18 is formed in a swelled shape including at least upper surfaces 19a, rear surfaces 19b, and side surfaces 19c. Joining flanges for joining to the rear lamp house panels 4 and the back panel section 8 are formed around the upper surfaces 19a, the rear surfaces 19b, and the side surfaces 19c. Moreover, the upper surfaces 19a of the swelling sections 19 and the side surfaces 4b of the rear lamp house panels 4 are arranged to be continuously linked. The rear surfaces 19b of the swelling sections 19 and the rear surfaces 4a of the rear lamp house panels 4 are arranged to be continuously linked. According to such an arrangement relation, loads generated when the lower side corner portions C of the closed cross-sectional structure are torsionally deformed are smoothly transferred while being smoothly flowing continuously from the lower side corner portions C to the swelling sections 19 of the tail end member 18. Local concentration of the loads is suppressed.

Figure 5:
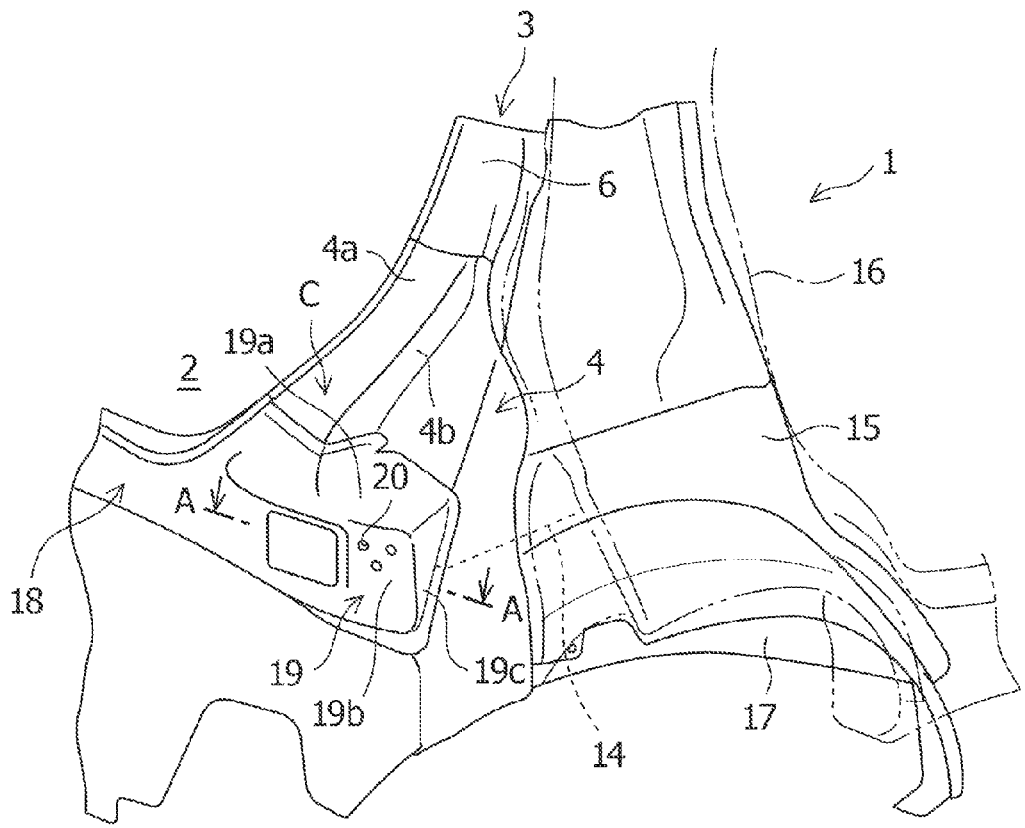
FIG. 5 is a perspective view showing a state in which a side body outer panel is removed in the X part in FIG. 1.
Figure 6:
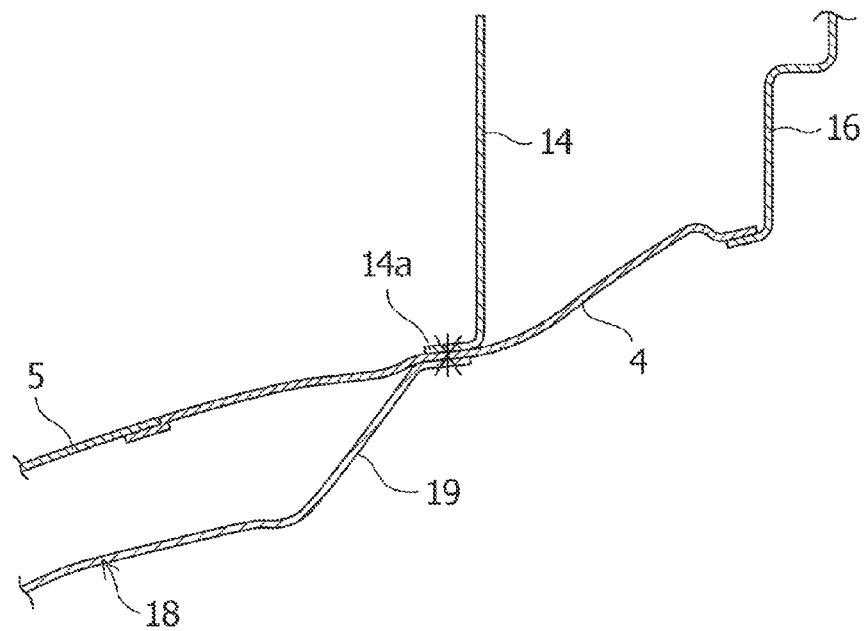
FIG. 6 is a sectional view taken along line A-A in FIG. 5.

In the vehicle body rear part 1 in this embodiment, as shown in FIGS. 5 and 6, vehicle body outer side portions of the swelling sections 19 of the tail end member 18 are placed over the middle portions of the quarter panels 14 with the rear lamp house panels 4 placed therebetween. The vehicle body outer side portions of the swelling sections 19, the rear lamp house panels 4, and the middle portions of the quarter panels 14 are joined by spot welding in three layers. Consequently, the vehicle body rear part 1 is configured such that joining strength of configuration members in the lower side corner portions C of the closed cross-sectional structure is increased and loads from the lower side corner portions C are transferred to outer side panel structure members such as the quarter panels 14 via the swelling sections 19.

Therefore, the quarter panels 14 are arranged on the inner sides of the side body outer panels 16 while being spaced apart from the inner sides and extended along the vehicle front and back direction. The rear end portions 14a of the quarter panels 14 are bent at a right angle in the vehicle width direction and formed to be placed on front side intermediate surfaces of the rear lamp house panels 4. Vehicle body outer side portions of the rear lamp house panels 4 are joined to the side body outer panels 16.

Figure 2:
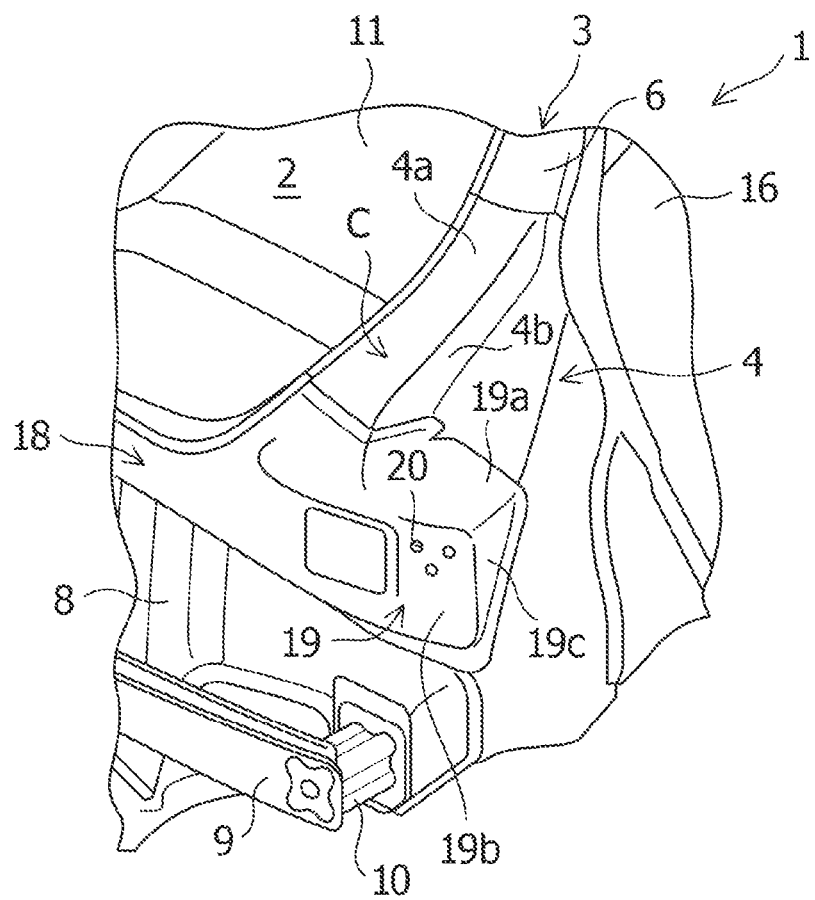
FIG. 2 is a perspective view showing an X part in FIG. 1 in enlargement.
Figure 3:
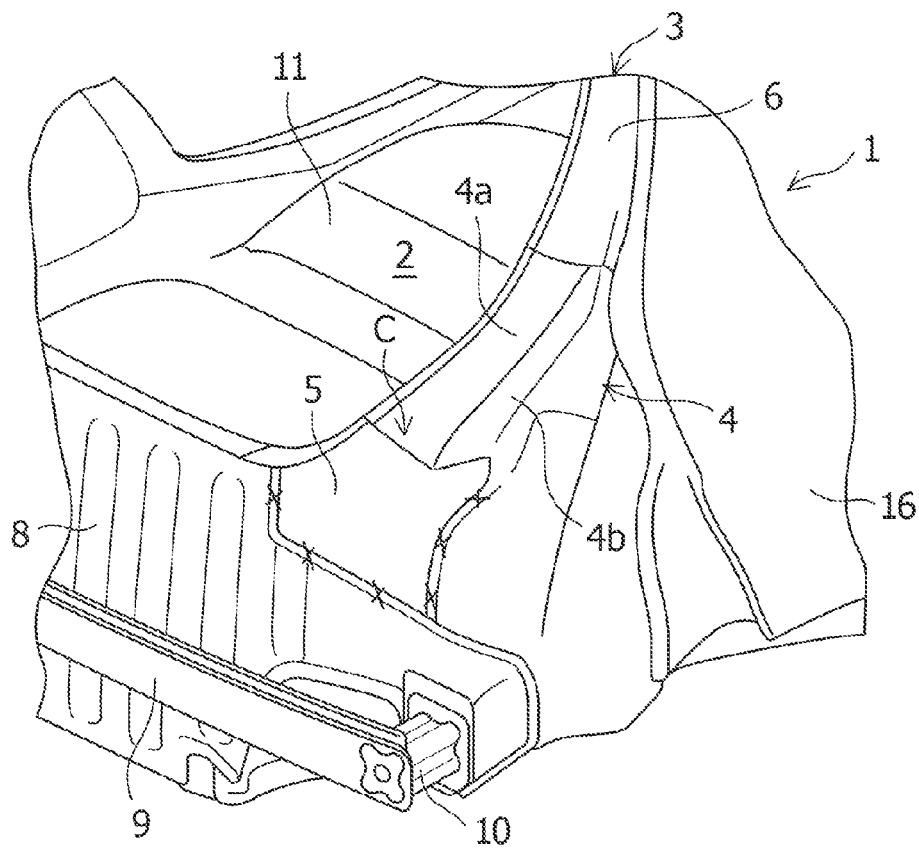
FIG. 3 is a perspective view showing a state in which a tail end member is removed in FIG. 2.

Further, in the swelling sections 19 of the tail end member 18 in the structure in this embodiment, as shown in FIGS. 1, 2, and 5, not-shown outlet and inlet components (ventilation components, etc.) for vehicle interior air are arranged. Therefore, in the rear surfaces 19b of the swelling sections 19, a plurality of communication holes 20 communicating with the outlet and inlet components are provided. Consequently, in the vehicle body rear part 1 in this embodiment, it is unnecessary to separately provide spaces for arranging the outlet and inlet components for the vehicle interior air. It is possible to arrange the ventilation components making use of the hollows in the swelling sections 19 of the tail end member 18. Moreover, corner portions of the outer side panel structure members of the vehicle body rear part 1 are arranged adjacent to the rear end of a vehicle interior luggage compartment space. Therefore, the corner portions can communicate with the outlet and inlet components at a short distance. Control of the vehicle interior air is simplified. Therefore, it is possible to simplify the structure of the ventilation components.

As explained above, in the structure of the vehicle body rear part 1 according to the embodiment of the present invention, the tail end member 18 extending along the vehicle width direction is coupled to the lower side corner portions C of the closed cross-sectional structure located on both the left and right sides of the back door opening section 2 arranged to incline. The swelling sections 19 extending further outward than the lower side corner portions C of the closed cross-sectional structure are provided on both the left and right sides of the tail end member 18. The swelling sections 19 are joined to the rear lamp house panels 4 arranged in the lower side corner portions C and the back panel section 8. Therefore, it is possible to improve the rigidity of the lower side corner portions C of the closed cross-sectional structure located on both the left and right sides of the back door opening section 2.

Figure 4:
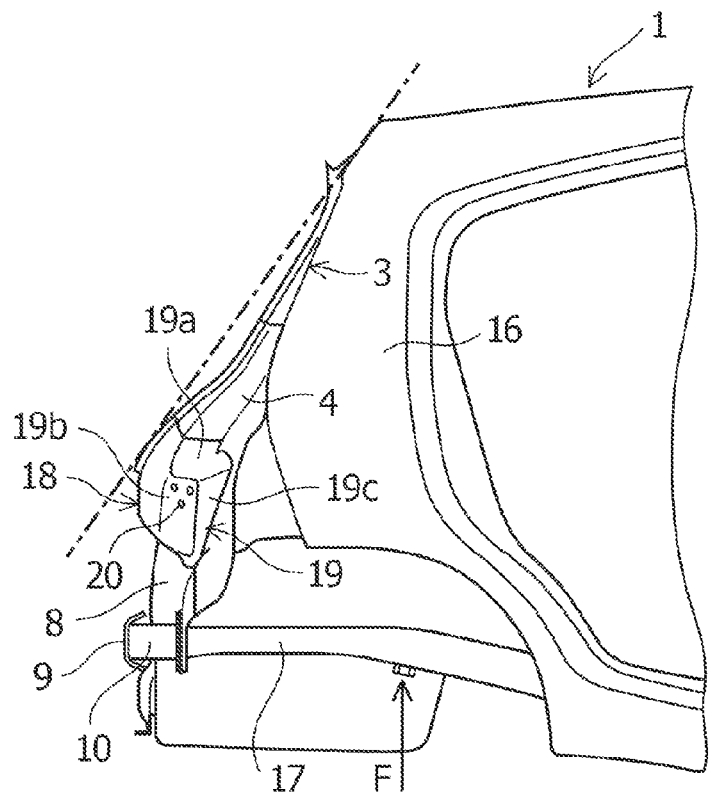
FIG. 4 is a side view showing the vehicle body rear part of the vehicle, to which the structure according to the embodiment of the present invention is applied.

In the structure of the vehicle body rear part 1 in this embodiment, the lower side corner portions C of the closed cross-sectional structure located on both the left and right sides of the back door opening section 2 are coupled to each other by the tail end member 18 including the swelling sections 19. Therefore, even if an upward load indicated by an arrow F in FIG. 4 is applied from a rear suspension on one side among a pair of left and right rear suspensions and the like and the load acts obliquely on the back door opening section 2 of the closed cross-sectional structure, it is possible to surely reduce distortion of the lower side portions and the like of the closed cross-sectional structure in the vehicle front back direction on both the left and right sides and suppress twisting deformation of the vehicle body rear part 1. Moreover, the swelling sections 19 of the tail end member 18 swell further outward than the lower side corner portions C of the closed cross-sectional structure. The swelling sections 19 receive loads generated by twisting deformation or the like of the lower side corner portions C of the closed cross-sectional structure. Therefore, it is possible to further reduce distortion of the portion of the back door opening section 2 of the closed cross-sectional structure on the left and right. Therefore, if the structure of the vehicle body rear part 1 in this embodiment is applied to the vehicle, it is possible to realize improvement of driving stability and realize improvement of riding comfort performance.

The embodiment of the present invention is explained above. However, the present invention is not limited to the embodiment explained above. Various modifications and alterations are possible on the basis of the technical concept of the present invention.

REFERENCE SIGNS LIST 1 vehicle body rear part
2 back door opening section
3 pillar sections
4 pillar lower panels
4a rear surfaces
4b side surfaces
5 rear lamp house inner panels
8 back panel section
14 quarter panels
18 tail end member
19 swelling sections
19a upper surfaces
19b rear surfaces
19c side surfaces
20 communication holes
C lower side corner portions

The invention claimed is:

1. Structure of a vehicle body rear part in which a back door opening section around which a closed cross-sectional structure is provided in the vehicle body rear part including rear lamp house panels and back panels and the back door opening section is arranged to incline obliquely such that a lower part is located further toward a vehicle back than an upper part, wherein
 a tail end member extending along a vehicle width direction is coupled to lower side corner portions of the closed cross-sectional structure located on both the left and right sides of said back door opening section,
 a part of said rear lamp house panels is formed in a shape having rear surfaces and side surfaces, and
 swelling sections extending further outward in a vehicle width direction than the lower side corner portions of said closed cross-sectional structure are provided on both the left and right sides of said tail end member, the swelling sections are formed in a shape having at least upper surfaces, rear surfaces, and side surfaces; the upper surfaces of said swelling sections and the side surfaces of said rear lamp house panels are arranged to be continuously linked, and the rear surfaces of said swelling sections and the rear surfaces of said rear lamp house panels are arranged to be continuously linked, and the swelling sections are joined to said rear lamp house panels and said back panels.

2. The structure of the vehicle body rear part according to claim 1, wherein vehicle body outer side portions of the swelling sections of said tail end member are joined to quarter panels that configure outer side panel structure members of the vehicle body rear part.

3. The structure of the vehicle body rear part according to claim 2, wherein outlet and inlet components for vehicle interior air are arranged in the swelling sections of said tail end member, and communication holes for said outlet and inlet components are provided in the rear surfaces of said swelling sections.

4. The structure of the vehicle body rear part according to claim 1, wherein outlet and inlet components for vehicle interior air are arranged in the swelling sections of said tail end member, and communication holes for said outlet and inlet components are provided in the rear surfaces of said swelling sections.

5. The structure of the vehicle body rear part according to claim 1, wherein vehicle body outer side portions of the swelling sections of said tail end member are joined to quarter panels that configure outer side panel structure members of the vehicle body rear part.

6. The structure of the vehicle body rear part according to claim 1, wherein outlet and inlet components for vehicle interior air are arranged in the swelling sections of said tail end member, and communication holes for said outlet and inlet components are provided in the rear surfaces of said swelling sections.

* * * * *